United States Patent [19]

Smith et al.

[11] E Patent Number: Re. 32,764

[45] Reissued Date of Patent: Oct. 11, 1988

[54] SLEEVE TYPE FLANGED BEARING

[75] Inventors: John R. Smith, St. Clair Shores; Ronald J. Thompson, Brighton, both of Mich.

[73] Assignee: Federal-Mogul Corporation, Southfield, Mich.

[21] Appl. No.: 748,414

[22] Filed: Jun. 24, 1985

Related U.S. Patent Documents

Reissue of:

[64] Patent No.: 4,017,127
Issued: Apr. 12, 1977
Appl. No.: 583,008
Filed: Jun. 2, 1975

[51] Int. Cl.[4] ..... F16C 17/10

[52] U.S. Cl. ..... 384/275; 384/288; 384/295

[58] Field of Search ..... 384/275, 296, 295, 288, 384/429, 432

[56] References Cited

U.S. PATENT DOCUMENTS

| | | |
|---|---|---|
| 73,183 | 1/1968 | Henfield . |
| 417,252 | 12/1889 | Ladd . |
| 734,171 | 7/1898 | Hamilton . |
| 895,425 | 8/1908 | Buxton . |
| 938,302 | 10/1909 | Davis . |
| 1,020,522 | 3/1912 | Henry, Jr. . |
| 1,426,715 | 8/1922 | Cramer . |
| 1,442,422 | 1/1923 | Barton . |
| 1,462,929 | 7/1921 | Barton . |
| 1,649,258 | 11/1927 | Rummins . |
| 1,742,513 | 3/1927 | Leonard . |
| 2,047,706 | 6/1934 | Reed . |
| 2,125,028 | 6/1936 | Kivlen et al. . |
| 2,177,565 | 6/1938 | Hefferin . |
| 3,375,563 | 4/1968 | Kingsbury et al. ..... 29/149.5 |
| 3,713,714 | 1/1973 | Hill et al. . |
| 3,795,428 | 3/1974 | Paine et al. . |
| 3,929,395 | 12/1975 | Stojek . |
| 3,972,576 | 8/1976 | Hill . |

FOREIGN PATENT DOCUMENTS

| | | |
|---|---|---|
| 2528576 | 1/1976 | Fed. Rep. of Germany . |

*Primary Examiner*—Lenard A. Footland
*Attorney, Agent, or Firm*—Robert F. Hess; Lawrence J. Shurupoff

[57] ABSTRACT

A split multipiece flanged journal bearing for use as an engine crankshaft thrust-journal bearing or the like wherein the thrust flanges and journal bearing shells are semi-cylindrical and have interlocking means to prevent rotational motion of the thrust flange relative to the respective bearing shell and with potential replacement interchangeability so that any worn or damaged parts may be replaced without changing the whole bearing and so that any one or all thrust flanges may be replaced without removing the crankshaft from the engine and wherein the notch and interlocking lug at one end of a particular combination of thrust flange and bearing shell is of greater arc length than those at the other end to provide a fail-safe feature to assure correct assembly.

11 Claims, 2 Drawing Sheets

SLEEVE TYPE FLANGED BEARING

Matter enclosed in heavy brackets [ ] appears in the original patent but forms no part of this reissue specification; matter printed in italics indicates the additions made by reissue.

BACKGROUND OF THE INVENTION

1. Field of the Invention

Our invention is adapted for use as a thrust-journal bearing in the main thrust position of an internal combustion engine, compressor, or similar device, for supporting a rotating crankshaft. Such a bearing is constantly being subjected to axial and radial loads of varying magnitude. The journal bearing portion supports the radial loads which are induced by firing, compression, inertia, and gravity while the thrust washer portion accepts or absorbs the axial loads generally resulting from acceleration, deceleration, clutch disengagement, et cetera.

2. Description of the Prior Art

In the early days of development of the plain bearings, as our type of bearing is generally referred to in distinction from anti-friction bearings of the ball and roller type, it was found that compatable metallic alloys of different hardnesses gave improved performance when mated together with a continuously separating oil film. In most cases the journal was a steel shaft and the non-rotating mating surface of the bearing was usually some alloy of tin, copper, and antimony known as babbitt metal. Plain bearings were made by melting the babbitt metal and casting it directly into a bearing recess where it was allowed to harden before it was machined to the proper size. If a flanged bearing was required for accepting thrust loads as in our invention, it was also cast from the same pour to form an integral bearing unit. Alternatively, the thrust portion was cast as a separate piece and generally connected in some manner to the journal bearing. While there appears to be no particular development trend in the patent art it was known to use dowels or pins as an interlocking means such as shown in U.S. Pat. No. 2,177,565 issued in 1939 and it was also known to use a cast lug on the thrust flange for interlocking with a corresponding groove or depression formed in the upper journal as shown in U.S. Pat. No. 734,171, issued in 1903. It is believed that by far the most conventional type was the pinned bearing unit. These units performed well. The journal bearing portion was over designed but provided a good bearing surface and was sufficiently flexible for yielding to whatever extent necessary to absorb the higher loads. Likewise, the thrust washers were in some instances replaceable apart from the sleeve portion and without having to disassemble the crankshaft from the engine block. However, under the demands of mass production there was developed, beginning in the early 1940's, bimetallic bearing strip, made of a comparatively thick piece of sheet steel to which a comparatively thin layer of bearing alloy has been sintered, as shown in U.S. Pat. No. 2,986,464, previously owned by the assignee of the present invention. This type of bearing was fabricated from such strip with the thrust flange being either stamped or roll formed. With this the advantages of the multipiece thrust-journal bearing were lost. More recently, economic conditions, including high material costs and bearing replacement labor costs have again forced consideration of the multipiece combination thrust and journal bearing. U.S. Pat. No. 3,713,714 is one indication of renewed recognition of the need for such a bearing. Our invention offers an improvement over all the prior art known to us in both cost and ease of assembly and disassembly.

SUMMARY OF THE INVENTION

Our invention is to provide a split multipiece flanged journal bearing wherein the journal bearing parts and the thrust washer parts are semicylindrical and have interlocking lugs and notches to prevent rotational motion of the thrust flange in relation to the journal bearing. Said notches and said lugs being located essentially 180° apart on the ends of the [compartment] *component* parts and of alternately differing sizes with the smaller sets being at least ¼ inch long and the larger sets being at least twice the length of the smaller sets so that assembly in the wrong sequence gives an obvious overlapping mismatch.

It is also our invention to design the interlocking parts so that their relative dimensions make it impossible for the steel backing of the bi-metallic bearing to come into contact with the steel of the rotating journal or crankshaft.

Thus our bearing offers the inherent advantages over the prior art of low cost, superior performance, and extreme design flexibility. No matching of the engine block is required to secure the thrust washer and complete interchangeability between flange bearing and our five or six piece thrust-journal bearing design is possible. This is extremely important since this allows our invention to be directly substituted for flange bearings in current use. If, however, our bearing is used in the original equipment, it allows replacement of damaged parts without the removal of the crankshaft as is required when replacing dowel-pinned thrust washers. Economy is further served by our invention since it permits flexibility in selecting exotic and expensive materials for severe loading conditions and less expensive materials for lighter loading which is usually the case when considering radial loads versus thrust loads in an engine.

Economy in shipping is also attained when parts can be nested or layered as opposed to shipping fully assembled bearings.

It is our main objective to provide a thrust-journal bearing in which the parts are individually separable and interchangeable so that it is possible to replace those parts and only those parts which are damaged or worn.

Other more specific objectives are embodied in the advantages stated over the prior art and still others will be apparent on review of the detailed description of our preferred embodiment.

DESCRIPTION OF THE PREFERRED EMBODIMENT

Figure 1:
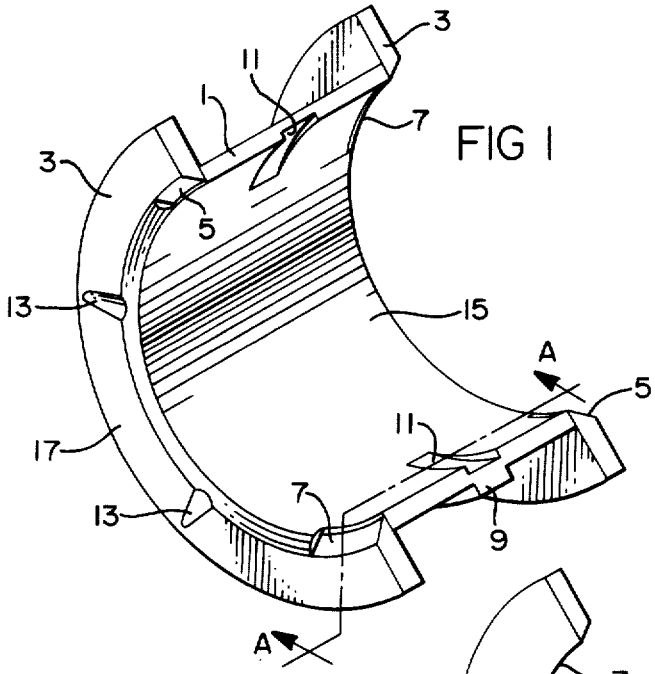
FIG. 1 is an isometric view of an assembled half bearing with two flanges.

In FIG. 1 there is shown half of an assembled double flanged thrust-journal bearing comprised of bimetallic strip steel alloy, journal bearing 1 having a radial support surface 15 and with oil grooves 11 spaced at either end 180° apart. An external lip 9 keys into the housing in which the bearing is to fit and prevents any circumferential and/or axial motion between said journal bearing 1 and said housing. The flanges or thrust [washes] *washers* 3 are keyed to either side of the journal bearing 1 with large lug 7 at one end and small lug 5 at the other end 180° apart. The thrust load bearing surface 17 is interrupted by oil grooves 13 where oil is admitted to the interface between shaft and washer 3 to form a thrust load bearing oil film. Oil grooves 11 provide the oil film forming function for the radial load bearing surface 15.

Figure 2:
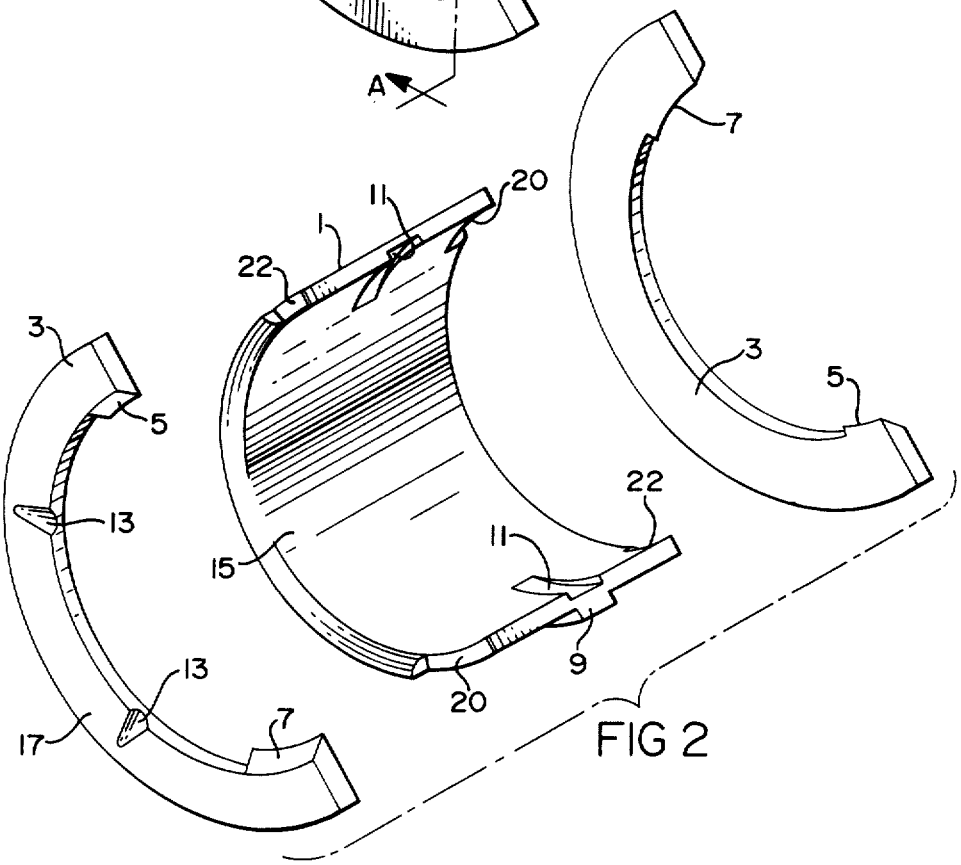
FIG. 2 is an exploded isometric view of the assembly of FIG. 1.

The exploded view of FIG. 1 shown in FIG. 2 shows more clearly the small lugs 5 and the large lugs 7 on thrust washers 3. FIG. 2 also shows more clearly the matching small notches 22 and large notches 20 on journal bearing 1 in which small lugs 5 and large lugs 7 of thrust washers 3 fit. It should be noted that notches and lugs of equal arc/length must be matched or the thrust washers 3 are displaced circumferentially from the journal bearing 1. This obvious discrepency is a warning that an attempt is being made to assemble the thrust washers backwards in the bearing and the assembly will not go together. It should be further noted that this invention is fabricated by coining and blanking the notches and lugs on mating corners of [th] *the* component parts. Additionally and contrary to normal design, the journal bearings are extended axially on each end beyond the bearing housing so that the washer is retained in place on its inside diameter by engagement with the outside diameter of the plain bearing and by intermeshing the respective lugs and notches. *A loose fit is provided between the interengaged component bearing members so that unlimited axial displacement is permitted relative to one another member.*

Figure 3:
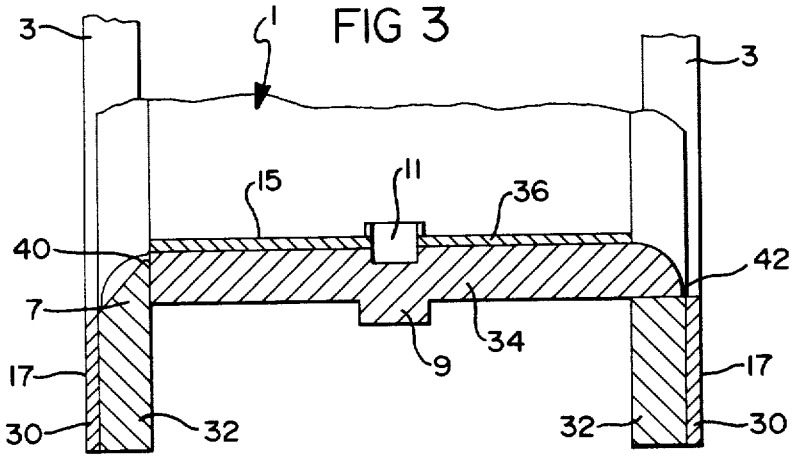
FIG. 3 is a cross-section of FIG. 1 taken along the line A—A.

FIG. 3 shows a cross-section across the bearing of FIG. 1 in the direction of the line A—A. This cross-section was specifically chosen because the left hand side depicts the relationship through a long lug 7 and a long notch 20 while the right hand side shows the relationship between journal bearing 1 and thrust washer 3 where there are no matching lugs and notches. FIG. 3 also shows the relationship of the thick steel support shell 34 to the thin layer of radial-load bearing alloy 36 of the journal bearing 1 and the load support surface 15. FIG. 3 shows in addition the relation between the heavy steel shell or backing 32 to the thin layer of thrust-load bearing alloy 30 of the thrust washer 3 and thrust load bearing surface 17.

Figure 4:
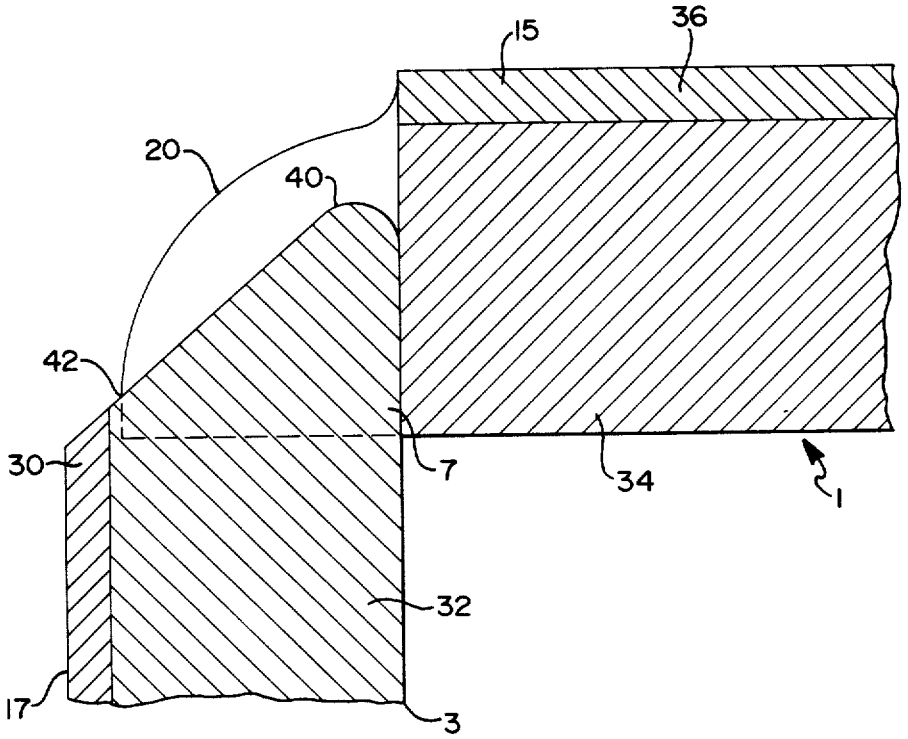
FIG. 4 is an enlarged cross-section of the left-hand junction of FIG. 3.

FIG. 4 is an enlarged view of the left-hand end of FIG. 3 to show in detail the relation of the thick steel shells 32 and 34 of the bearing to the thin layers of bearing alloy 30 and 36. The representation is of notch 20 of journal bearing 1 when it is fully meshed with lug 7 of thrust washer 3 to show that the lug 7 is shorter [radially/than] *radially than* the thickness of the steel backing shell 34 so that the end 40 will always be protected from the rotating shaft by the thin layer of load bearing alloy 36 and never protrude past the radial load bearing surface 15. In like manner the notch 20 in the heavy steel [baking] *backing* shell 34 of the journal bearing 1 is not as [axially/deep] *axially deep* as the thickness of the heavy steel backing 32 of the thrust washer 3. The end 42 of the journal bearing 1, therefore will always be protected from the rotating thrust load by the thin layer of load bearing alloy 30 of thrust washer 3 and will never extend beyond the load bearing surface 17.

The preferred embodiment might also include such standard features as chamfers at the edges of the different pieces, oil grooves that traverse the entire circumferential width of the thrust washers, and reliefs cut into the internal corners where the lugs join the body of the bearing. For clarity sake, however, these features have been left out of the drawing because they are not essential to nor are they intended to limit the invention. It should be appreciated, therefore, that the present invention is susceptable to modification, variation and change without departing from the spirit and scope of the invention as defined by the appended claims.

We claim:

1. A flanged engine bearing assembly comprising at least one first bearing member comprising a substantially semicylindrical engine bearing shell, at least one second bearing member comprising a loosely fitted, co-terminus substantially semicylindrical flange located on at least one axial end of said shell and extending radially outward therefrom, said shell and said flange including interengaging support means for supporting said flange on said shell in a manner permitting unlimited axial displacement of said bearing members relative to one another and preventing unlimited relative circumferential rotation, said [locking] *interengaging* means including a plurality of relatively spaced notches along the co-terminus portion of one of said bearing members and a plurality of projecting lugs along the correspondingly co-terminus portion of said other bearing member, and each said lug being in loosely and separable interfitting engagement with a respective one of each of said notches such that the bearing members may be axially separated from one another even as installed on a crankshaft within an engine.

2. A flanged engine bearing assembly as defined in claim 1 wherein, the projecting lugs are part of said flange, and the notches are part of said engine bearing shell.

3. A flanged engine bearing assembly as defined in claim 1 wherein, said notches and lugs are located at the terminal ends of each of said bearing members.

4. A flanged engine bearing assembly as defined in claim 2 wherein, the projecting lugs extend radially inwardly of said flange.

5. A flanged engine bearing assembly as defined in claim 4 wherein, said notches and lugs are located at the terminal ends of each of said bearing members.

6. A flanged engine bearing assembly as defined in claim 5 wherein, one pair of interfitting notches and lugs is of lesser arc length than the other pair of interfitting notches and lugs, whereby any mismatch of mating parts during assembly will be visually apparent.

7. A flanged bearing assembly as defined in claim 6 wherein, each said bearing member is of bimetallic composition and includes a backing portion and a bearing surface portion of bearing material.

8. A flanged engine bearing assembly as defined in claim 7 wherein, the bearing surface portion of said flange is of different bearing material then the bearing surface portion of said bearing shell.

9. A flanged engine bearing assembly as defined in claim 7 in which the axial depth of each notch of said pair of notches is less than the thickness of the backing portion of said [other bearing member] *flange.*

10. A flanged engine bearing assembly as defined in claim 9 in which the radial length of each radially projecting lug does not exceed the thickness of the backing portion of said bearing shell.

11. A flanged engine bearing assembly as defined in claim 10 wherein, the bearing surface portion of said flange is of different thickness than the bearing surface portion of said bearing shell.

* * * * *